United States Patent
Terrasi et al.

(10) Patent No.: US 12,428,057 B2
(45) Date of Patent: Sep. 30, 2025

(54) STEERING SYSTEM FOR A VEHICLE

(71) Applicant: DANA ITALIA S.R.L., Arco (IT)

(72) Inventors: Gianluca Terrasi, Arco (IT); Davide Deimichei, Ala (IT); Giuseppe Manica, Isera (IT); Gian Mario Ravasi, Riva del Garda (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/443,154

(22) Filed: Feb. 15, 2024

(65) Prior Publication Data
US 2024/0278830 A1 Aug. 22, 2024

(30) Foreign Application Priority Data

Feb. 16, 2023 (DE) .......................... 20 2023 100 743

(51) Int. Cl.
*B62D 7/18* (2006.01)
(52) U.S. Cl.
CPC ..................................... *B62D 7/18* (2013.01)
(58) Field of Classification Search
CPC ................................. B62D 7/18; B60B 35/003
See application file for complete search history.

(56) References Cited

U.S. PATENT DOCUMENTS

| | | | | |
|---|---|---|---|---|
| 3,288,485 A | * | 11/1966 | White | B62D 7/18 384/396 |
| 3,549,166 A | * | 12/1970 | Moore | B60G 7/005 384/396 |
| 5,785,332 A | * | 7/1998 | Pollock | B62D 7/18 301/131 |
| 6,293,022 B1 | | 9/2001 | Chino et al. | |
| 7,740,253 B2 | | 6/2010 | Ziech | |
| 8,388,003 B2 | | 3/2013 | Wellman et al. | |
| 2007/0138754 A1 | * | 6/2007 | Moreau | B60B 27/00 280/93.512 |
| 2010/0219598 A1 | * | 9/2010 | Ziech | B62D 7/18 280/93.512 |

FOREIGN PATENT DOCUMENTS

| | | | | |
|---|---|---|---|---|
| CN | 107487359 A | * | 12/2017 | |
| CN | 107458461 B | * | 9/2023 | B62D 7/16 |
| DE | 202019005851 U1 | * | 9/2022 | |
| EP | 0520121 A1 | * | 12/1992 | F16C 11/045 |

OTHER PUBLICATIONS

Yuan et al. CN 107487359, Machine English translation, ip.com (Year: 2017).*
Zhang et al. CN 107458461, Machine English translation, ip.com (Year: 2023).*
Dana Italia SRL DE 20 2019 005851 Machine English Translation (Year: 2022).*

* cited by examiner

*Primary Examiner* — Karen Beck
(74) *Attorney, Agent, or Firm* — McCoy Russell LLP

(57) ABSTRACT

The present disclosure relates to a steering system for a vehicle, the steering system including an axle and a steering lever. The steering lever is fixedly connected to a separate upper kingpin member which is mounted in a rotatable manner relative to the axle.

19 Claims, 3 Drawing Sheets

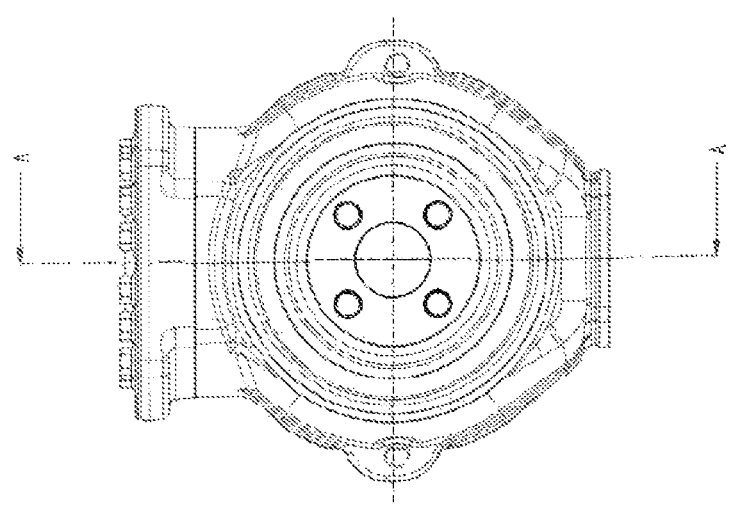
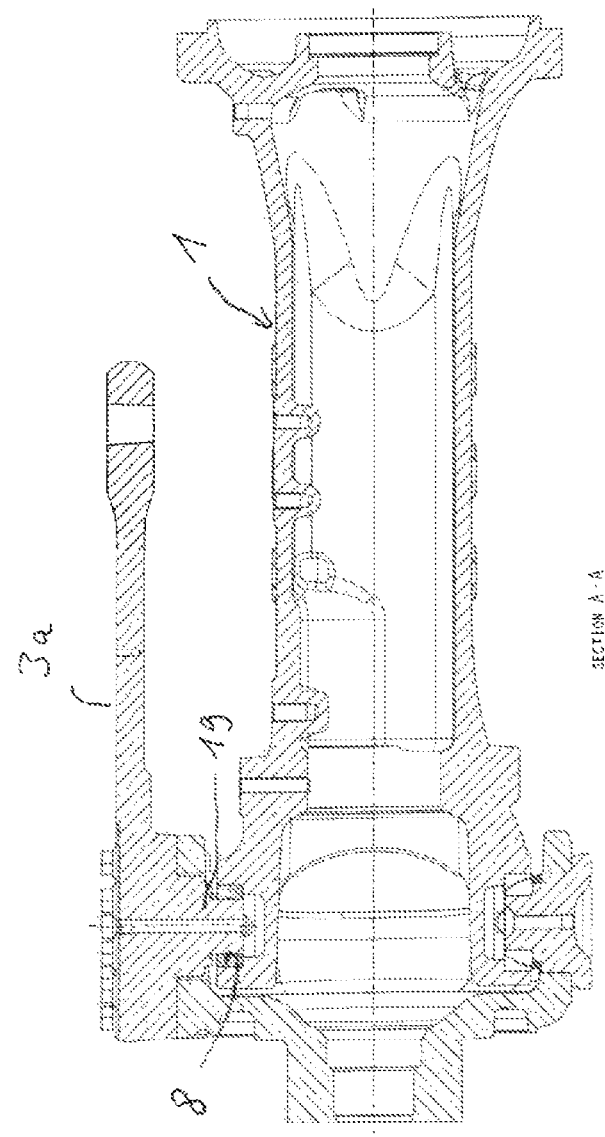
Fig. 2

STEERING SYSTEM FOR A VEHICLE

CROSS-REFERENCE TO RELATED APPLICATION

The present application claims priority to German Utility Model Application No. 20 2023 100 743.0, entitled "STEERING SYSTEM FOR A VEHICLE", and filed Feb. 16, 2023. The entire contents of the above-listed application is hereby incorporated by reference for all purposes.

TECHNICAL FIELD

The present disclosure relates to the area of mechanical engineering and is typically applicable in vehicle steering systems where one or more wheels are pivotably connected to a steering axle of the vehicle.

BACKGROUND AND SUMMARY

Conventional vehicles like cars usually have at least one steering axle with a steering system. A steering knuckle is connected to a body that forms a wheel hub or a spindle for mounting a wheel. For example, the steering knuckle may be mounted to the steering axle in a rotatable manner by a kingpin, wherein the kingpin usually defines the axis of rotation of the steering knuckle.

Steering systems of this type are well known from the prior art. For example, U.S. Pat. No. 8,388,003 B1 describes a pivotable steering knuckle which is driven by a piston/cylinder drive.

U.S. Pat. No. 6,293,022B1 discloses a steering knuckle with a kingpin for a steering axle of a fork lifter, wherein the wheels are steered by a cylinder and wherein a wheel angle sensor is provided for detecting a position of the kingpin.

U.S. Pat. No. 7,740,253B2 describes a vehicle steer axle assembly wherein a steering knuckle is coupled to the axle by a male element which is integrally formed with the steering knuckle and which is in a rotatable manner positioned in a female element of the axle.

Considering the background described above, it is a goal of the disclosure to create a flexible solution for mounting a steering knuckle on an axle in a rotatable manner wherein the solution shall allow for an easy adaptation of the mounting to different steering axle assemblies.

Hence, the disclosure relates to a steering system for a vehicle, wherein the steering system includes an axle and a steering lever.

To achieve the goal of the disclosure, the steering lever is fixedly connected to a separate upper kingpin member which is mounted in a rotatable manner relative to the axle.

The upper kingpin member may be mounted in a rotatable manner about a first axis in a first opening of the axle.

Typically, the steering system further comprises a steering knuckle. Usually, the steering knuckle is pivotably mounted on the axle. The steering lever may be fixedly connected or connectable to the steering knuckle. The steering lever and the steering knuckle may be pivotable about the or a first axis.

According to this solution, the steering lever on one hand and the upper kingpin member on the other hand are different, separate parts that can be made of the same material or of different materials, for example of the same steel or of different steel alloys. The steering lever and the upper kingpin are put together and connected to form part of the steering system. This way, for example in different modifications of the steering system, one and the same type of steering lever can be combined with different types of upper kingpin members to achieve different solutions fitting to different vehicles. It can also be provided, that the same type of upper kingpin member can be used with different types of steering levers to implement different steering systems.

The upper kingpin member may protrude into the first opening of the axle. The first opening in the axle may form a part of a rotational bearing for the upper kingpin member.

In this case, the upper kingpin member is configured to rotate in the first opening of the axle. For example, the upper kingpin member may carry a part of the load of the vehicle that is transferred from the axle to the wheel.

In order to form the bearing, an additional friction ring may be disposed between the wall of the first opening in the axle and the upper kingpin member, such as the circumferential surface to the upper kingpin member.

The steering lever and the upper kingpin member may be made of different materials. For example, the upper kingpin member may include or may at least partially consist of a hardened metal. In most cases, the upper kingpin member can consist of a hard or hardened steel alloy. For instance, at least the outer cylindrical surface/circumferential surface of the upper kingpin member may be hardened.

The upper kingpin member may be fixedly connected to the steering lever by a press-fit. Since the upper kingpin itself usually does not have to transfer a high level of torque, a press-fit may be sufficient to form a reliable mechanical connection between the steering lever and the upper kingpin member. An end of the upper kingpin member, for example a cylindrical end of the upper kingpin member, can be pressed into an opening formed in the steering lever. This opening in the steering lever and/or the end of the upper kingpin member may have a slightly conical shape to facilitate the press-fit, for example.

The first opening in the axle receiving the upper kingpin member may be a blind hole.

By this measure, it is usually possible to place a friction ring in the first opening when mounting the upper kingpin member in the first opening. Also, a lubricant can be contained or stored in the first opening to reduce the frictional forces and wear.

The steering lever may be fixed to a hub of the steering knuckle by screws.

Obviously, the steering lever shall be connected to the steering knuckle in order to transfer the movement and torque which is necessary for steering a wheel and transferring static and dynamic forces. For this purpose, a connection by means of one or more screws, possibly more than ten screws, between the steering knuckle and the steering lever can be provided.

A first end of the upper kingpin member may be press-fit into an opening of the steering lever. Additionally or alternatively, a second end of the upper kingpin member may protrude into the first opening of the axle. And a middle portion of the upper kingpin member between its first and second ends may protrude through an opening formed in the steering knuckle. In this way, the upper kingpin member may transfer a share of the force directly from the steering knuckle to the axle. On the other hand, it can be provided that the upper kingpin protrudes through the opening of the steering knuckle with backlash, i. e. there may be space between the upper kingpin member and the material of the steering knuckle, and the upper kingpin member may not be in contact with the walls of the opening formed in the steering knuckle.

In some embodiments, three or more screws connecting the steering lever with the steering knuckle may be distributed around the opening of the steering lever into which the upper kingpin member is press-fit. In some implementations, more than ten screws may be provided around the opening.

As already mentioned above, the upper kingpin member and the first opening in the axle may form part of a friction bearing. For instance, this bearing may then be configured to stand the dynamic and static forces occurring when a heavy vehicle is supported by its wheels not only during a straight movement but also in curves. Alternatively, the friction bearing may be replaced by a needle bearing since a needle bearing, too, is typically capable of supporting heavy loads.

In some embodiments, the axle, on a side of the axle opposite the first opening receiving the upper kingpin member, may have a second opening, such as a blind hole. A lower kingpin member connected to the steering knuckle may be received in this second opening, wherein a symmetry axis of the lower kingpin member may be substantially identical to the first axis.

In this way, the upper and lower kingpin members may be rotatable about the same axis, and both may support the steering knuckle in a rotatable manner.

The lower kingpin member often has to carry less of the load and can therefore typically consist of a material which is different from the material of the upper kingpin member and which may not have the same hardness as the material of the upper kingpin member and/or which is not hardened.

The disclosure will be described in further details with reference to figures of drawings, wherein

BRIEF DESCRIPTION OF THE FIGURES

FIG. 2 shows on the left side a cross-sectional view of parts of a steering system according to the prior art and on the right side another cross sectional view of the same configuration, in which the position of the cross section of the left side is marked by a line A-A.

DETAILED DESCRIPTION

In the figures, identical or functionally identical parts may in most cases be denoted by the same reference signs.

Figure 1:
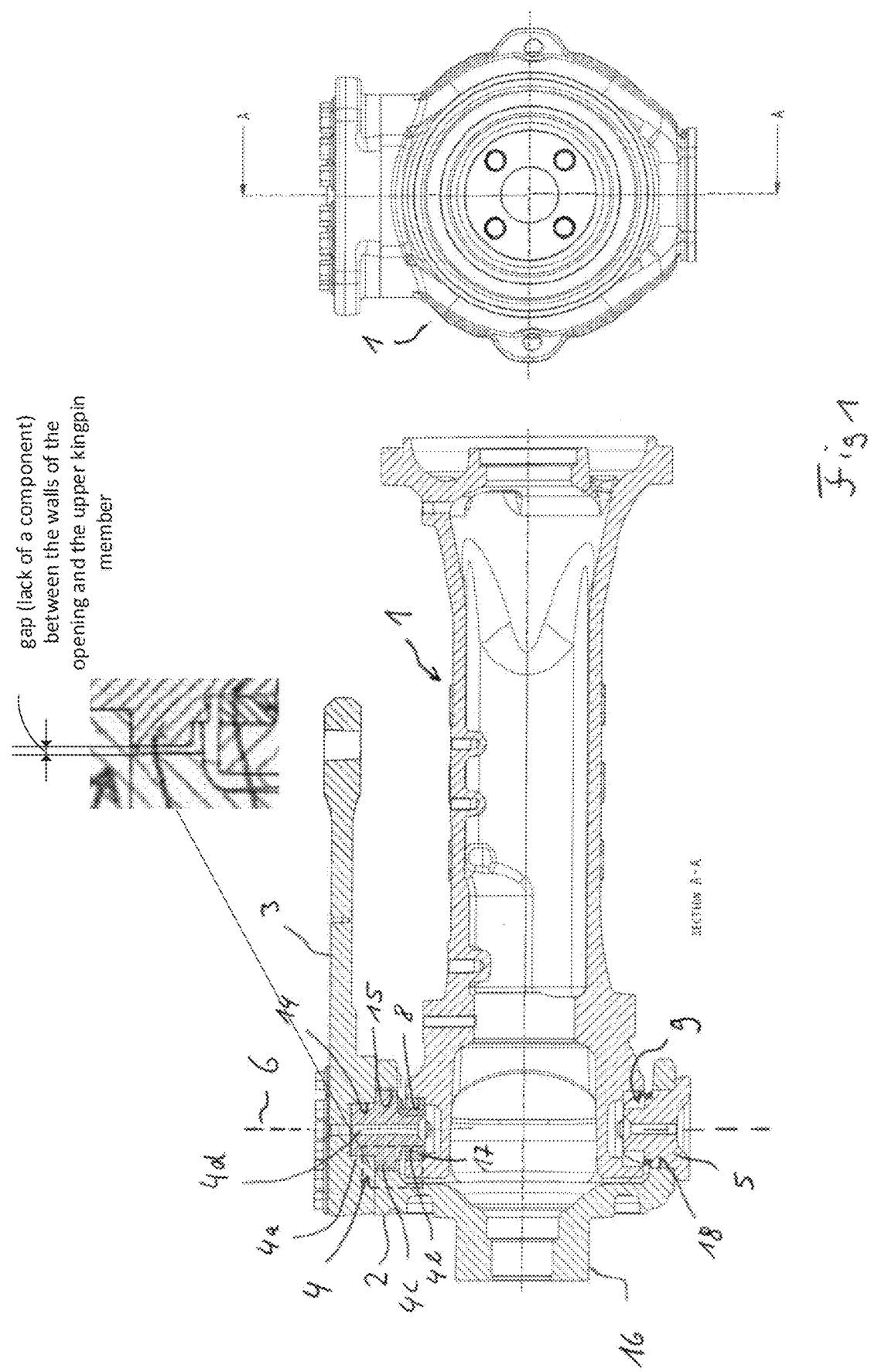
FIG. 1 shows on the left side a cross-sectional view of parts of a steering system according to the current disclosure and on the right side another cross sectional view of the same configuration, in which the position of the cross section of the left side is marked by a line A-A.

FIG. 1 shows on the right side a view on an axle 1 of a vehicle, wherein the rotational axis of the wheels is perpendicular to the drawing plane. The line A-A denotes the position of the cross section which is shown on the left side of the same figure. On the left side, a steering knuckle 2 is shown with a hub 16 for a wheel (the wheel is not shown in the figures). A steering lever 3 on the upper side of the steering knuckle is coupled by a chain of additional mechanical elements to a steering element like a steering wheel (also not shown in the figures). As the steering lever 3 is fixedly connected to the steering knuckle 2 by screws and both are rotatable about a first axis 6, a wheel can be steered by the steering lever 3. An upper kingpin member 4 which has a generally cylindrical shape is fixed to the steering lever 3 by a press-fit connection. The upper end 4a of the upper kingpin member 4 is press-fit into an opening 14 formed in the steering lever 3. The upper end 4a of the kingpin member 4 and/or the opening 14 for this purpose may have a conical shape or a slightly conical shape.

The upper kingpin member 4 has a middle portion 4c which protrudes through an opening 15 in the steering knuckle and a lower end 4b which is positioned in a first opening 8 of the axle 1. In the first opening 8, a rotational frictional bearing is formed by the upper kingpin member 4 and the wall of the first opening 8 of the axle. A friction ring 17 is positioned between the upper kingpin member and the wall of the first opening for reducing friction. Further, in this area a lubricant can be provided for further reducing frictional forces and wear. The first opening 8 in the axle has the shape of a blind hole to makes sure that the lubricant can be collected at the ground of the opening.

The upper kingpin member 4 and the first opening 8 of the axle 1 define the rotational first axis 6 and hence the rotational movement of the steering knuckle.

The upper kingpin member 4 may be made of a steel alloy, for example of steel including Ni/Cr. The steel alloy from which the upper kingpin member may be formed may be at least partially hardened, at least at its lower end 4b.

The axle 1 has a second opening 9 which is located at the opposite side of the first opening 8, in the figures at the lower side of the axle. In this second opening, a lower kingpin member 5 is located, forming another rotational bearing with the second opening. The lower kingpin member 5 is fixed to the steering knuckle 2 and protrudes through an opening 18 at the lower side of the steering knuckle. Due to the construction of the steering system, the static and dynamic load on this rotational bearing on the lower side of the axle 1 is considerably smaller than the load on the upper side of the axle, which acts on the first kingpin member 4. Therefore, the material of the lower kingpin member 5 can be different from the material the upper kingpin member is made of. For example, the lower kingpin member does not necessarily be hardened. The symmetry axis/rotational axis 7 of the lower kingpin member is aligned with the first axis 6.

In FIG. 2, a construction according to the prior art is shown with an axle 1 and a steering lever 3a, which is different from the presently proposed steering system. The steering lever 3a according to the prior art has a kingpin element 19 which protrudes into a first opening 8 of the axle and forms, together with the wall of the first opening, a rotational bearing. However, the kingpin element 19 is integrally formed with the steering lever 3a.

It is therefore difficult for the kingpin element 19 to have mechanical properties which are different from the properties of the steering lever 3a, such as a different material or a different hardness.

In addition, if an axle of a different vehicle needs an adaptation of the kingpin element 19, the whole steering lever has to be redesigned and tools for its production have to be adapted.

Figure 3:
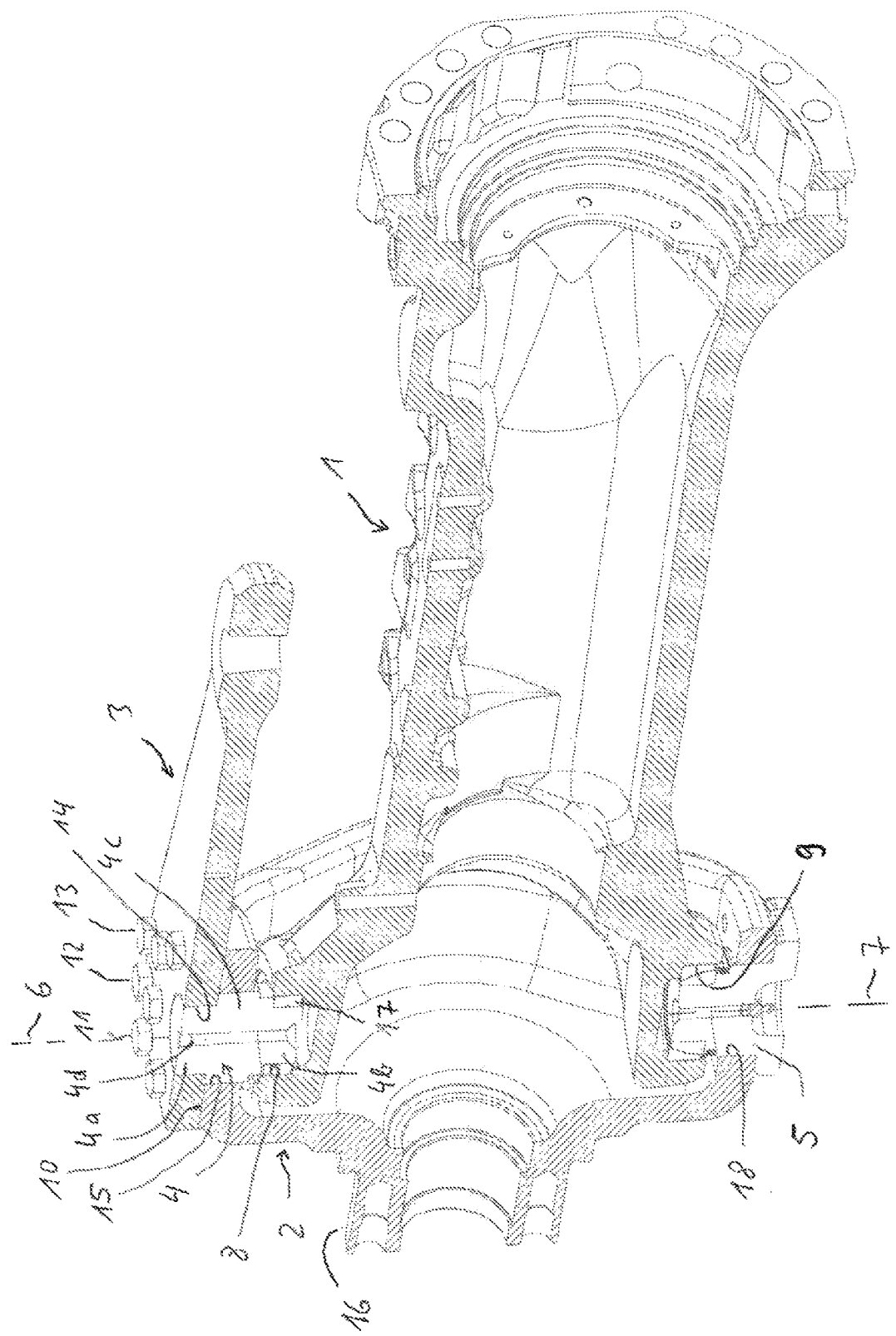
FIG. 3 shows a 3-dimensional view of parts of a steering system which is similar to the system shown in FIG. 1.

FIG. 3 shows another steering system of the presently proposed type which is very similar to the system shown in FIG. 1, but in a 3-dimensional view. In FIG. 3, it is easily visible that several screws 11, 12, 13 are provided for fixing the steering lever 3 to the steering knuckle 2. In a special implementation, 14 screws may be provided for this connection. They are distributed around the openings 14, 15 in the steering lever 3 and the steering knuckle 2. In addition, a central bore 4d is provided which can serve for an additional connection between the upper kingpin member 4 and the steeling lever in case the opening 14 in the steering lever in which the upper kingpin member is press-fit is a blind hole, as shown in the example of FIG. 1. The bore 4d may also serve for providing lubricant for the rotational bearing which is formed in the first opening 8. FIGS. 1-3 are drawn to scale, although other relative dimensions may be used. FIGS. 1-3 show example configurations with relative positioning of the various components. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example

The invention claimed is:

1. A steering system for a vehicle, the steering system including an axle and a steering lever, wherein the steering lever is fixedly connected to a separate upper kingpin member which is mounted in a rotatable manner relative to the axle, and wherein the steering lever and the upper kingpin member are made of different materials,
    wherein the upper kingpin member protrudes through an opening of a steering knuckle without contacting walls of the opening of the steering knuckle, the upper kingpin member and the walls of the opening of the steering knuckle separated by a gap, and
    wherein the upper kingpin member protrudes into a first opening of the axle with a gap between a first end of the upper kingpin member and a ground of the first opening of the axle, and where a second end of the upper kingpin member is press-fit into an opening of the steering lever, and wherein a middle portion of the upper kingpin member between the first and second ends protrudes through the opening of a steering knuckle, a diameter of the middle portion being greater than a diameter of the first opening of the axle.

2. The steering system according to claim 1, wherein the upper kingpin member is mounted in a rotatable manner about a first axis in the first opening of the axle.

3. The steering system according to claim 1, wherein the steering lever is fixedly connected or connectable to a steering knuckle, and wherein the steering lever and the steering knuckle are pivotable about a first axis.

4. The steering system according to claim 1, wherein the upper kingpin member protrudes into the first opening of the axle, and wherein the first opening in the axle forms a part of a rotational bearing for the upper kingpin member.

5. The steering system according to claim 1, wherein the upper kingpin member consists at least partially of a hardened metal.

6. The steering system according to claim 1, wherein the upper kingpin member is fixedly connected to the steering lever by a press-fit.

7. The steering system according to claim 1, wherein the first opening in the axle receiving the upper kingpin member is a blind hole.

8. The steering system according to claim 1, wherein the steering lever is fixed to a hub of a steering knuckle by screws.

9. The steering system according to claim 1, wherein three or more screws connecting the steering lever with the steering knuckle are distributed around the opening of the steering lever into which the upper kingpin member is press-fit.

10. The steering system according to claim 1, wherein the upper kingpin member and the first opening in the axle form part of a friction bearing.

11. The steering system according to claim 2, wherein on a side of the axle opposite the first opening receiving the upper kingpin member the axle has a second opening receiving a lower kingpin member which is connected to a steering knuckle, and wherein a symmetry axis of the lower kingpin member is substantially identical to the first axis.

12. The steering system according to claim 11, wherein the second opening is a blind hole.

13. A steering system for a vehicle, the steering system including an axle and a steering lever, wherein the steering lever is fixedly connected to a separate upper kingpin member which is mounted in a rotatable manner relative to the axle, and wherein the steering lever and the upper kingpin member are made of different materials,
    wherein a middle portion of the upper kingpin member between a first end and a second end of the upper kingpin member protrudes through an opening of a steering knuckle, and
    wherein the upper kingpin member is prevented from contacting walls of the opening of the steering knuckle, and the steering system lacks a component sandwiched between the walls of the opening and the upper kingpin member.

14. The steering system according to claim 11, wherein the lower kingpin member contacts the walls of the second opening, and the steering system lacks a component sandwiched between the walls of the second opening and the lower kingpin member.

15. The steering system according to claim 13, wherein the upper kingpin member is mounted in a rotatable manner about a first axis in a first opening of the axle.

16. The steering system according to claim 15, wherein a diameter of the middle portion is greater than a diameter of the first opening of the axle.

17. The steering system according to claim 13, wherein the steering lever is fixed to a hub of the steering knuckle by screws.

18. The steering system according to claim 13, wherein the upper kingpin member is fixedly connected to the steering lever by a press-fit.

19. The steering system according to claim 15, wherein the upper kingpin member and the first opening of the axle form part of a friction bearing.

\* \* \* \* \*